INVENTORS
Howard W. Russell.
Ernest R. Darby.

Patented Dec. 17, 1935

2,025,020

UNITED STATES PATENT OFFICE 2,025,020

INTERNAL COMBUSTION ENGINE

Howard W. Russell, Columbus, Ohio, and Ernest R. Darby, Detroit, Mich., assignors, by direct and mesne assignments, to Federal-Mogul Corporation, Detroit, Mich., a corporation of Michigan Application April 6, 1934, Serial No. 719,348

6 Claims. (Cl. 123—191)

Our invention relates to internal combustion engines. It has to do, particularly, with cylinder heads for internal combustion engines, though it may be extended to the interior surfaces of the cylinder generally, if desired.

It has long been recognized that the efficiency of the internal combustion engine should increase with an increase in compression ratio. However, with internal combustion engines as hitherto constructed, the increase in compression ratio has given rise to certain undesirable conditions resulting in a decrease in the efficiency of the engine. For one thing, there arises a phenomenon which is known variously as detonation, knock or pinging and which is apparently due to a change in the nature of the combustion.

Various means of suppressing detonation have been suggested. In some cases, increase in the proportion of fuel in the fuel-air mixture or retarding the spark is recommended. However, these methods are somewhat undesirable. A common means suggested is the use of such fuel as gasoline with a high octane number.

Recently, there have come into use cylinder heads of an aluminum alloy. It is claimed that these aluminum cylinder heads can be operated without detonation at a compression ratio one unit higher than it is possible, under the same conditions, to operate the more common cast-iron cylinder heads. Such cylinder heads of aluminum alloy have been compared with those lined with thin sheet copper or with electroplated copper, the published description of the experiments indicating that cylinder heads made with a thin sheet copper lining or electroplated with copper are no better than cast-iron. On the whole, the records of the prior art, up to the time of our invention, are not favorable to the use of copper.

Others have suggested the use of copper-lined cylinder heads on the theory that the copper, having slight affinity for carbon, will tend to obviate the breaking down of the hydrocarbon vapor. Apparently, the thickness of the copper lining has not been considered material to those who have contemplated the use of copper linings for cylinder heads as a means for preventing detonation.

Our invention involves a recognition that the use of copper or copper alloys in cylinder heads of internal combustion engines will, if the copper is of adequate thickness markedly reduce detonation. The cylinder head may be made entirely of copper or copper alloy or the copper may be applied to the interior of the cylinder head.

We have found that electroplating copper to about ⅛ inch thickness into the dome of the combustion chamber of a cast-iron head results in the attainment of many of the advantages of an engine head made entirely of copper. A layer of copper of less thickness may suffice but we have found that, to secure a close approach to the full benefits of copper, a layer of copper thicker than $\tfrac{1}{32}$ inch is necessary. Any means by which a layer of copper can be placed in the head is satisfactory, provided the copper has a good and complete metallic bond with the backing metal.

To illustrate the application of our invention to an internal combustion engine, we have appended hereto a drawing wherein similar characters of reference designate corresponding parts and wherein.

Figure 1:
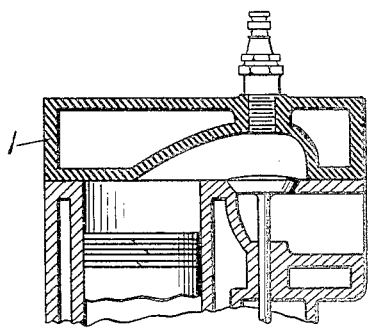
Figure 1 is a vertical section of a cylinder of our internal combustion engine with our engine head made entirely of copper.

In the drawing, with particular reference to Figure 1, the cylinder head is designated 1 and is of usual form, except that it is made entirely of copper.

Figure 2:
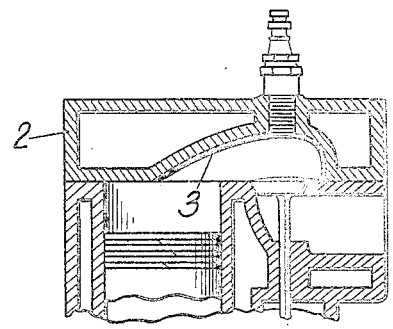
Figure 2 is a vertical section of a cylinder of our internal combustion engine with a layer of copper that has been electroplated into the dome of the cylinder head.

In Figure 2, the cylinder head is designated 2 and is formed of cast-iron or other metal with a layer 3 of copper formed thereon.

Figure 3:
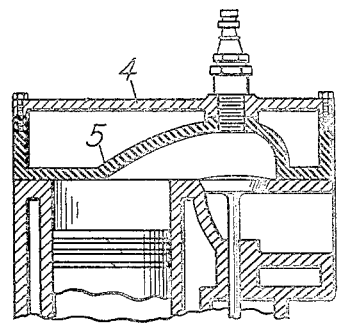
Figure 3 is a vertical section of a cylinder of our internal combustion engine wherein the cylinder head is made partly of cast-iron and partly of cast-copper, with the parts secured together in any suitable manner.

In Figure 3, the cylinder head is shown as being formed partly of cast-iron as at 4 and partly of cast-copper as at 5.

Figure 4:
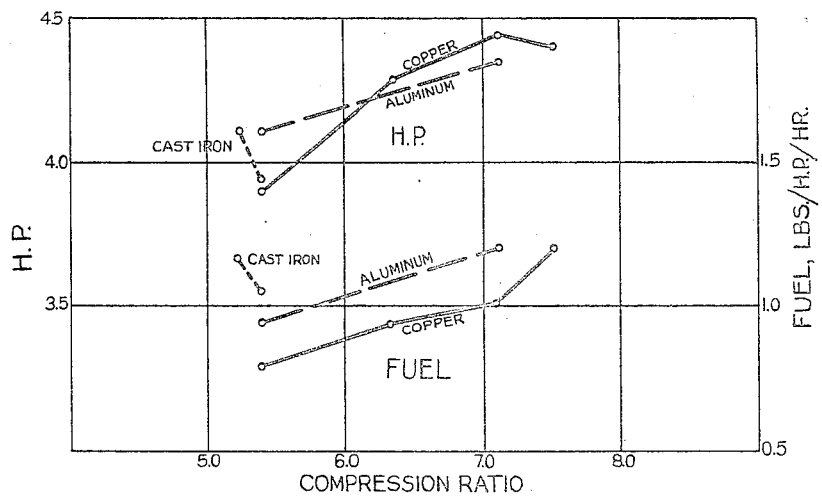
Figure 4 is a chart showing the results of certain comparative tests made of cylinder heads embodying our invention and of prior art cylinder heads on a single-cylinder engine. Similar results have been obtained on a multi-cylinder engine.

In tests of our internal combustion engine with an all-copper cylinder head, in comparison with tests of an internal combustion engine with cast-iron and aluminum heads, the performance of the engine at different compression ratios is illustrated in Figure 4. In this figure, the power and fuel consumption per horse-power hour are shown as functions of the compression ratio. Each test was made with the spark set for maximum power and the carbureter adjusted for minimum fuel consumption without detonation.

There was a drop in power with increased compression ratio at about 5.4 for the iron, 7.0 for the aluminum and 7.5 for the copper. However, the most striking advantage of the copper is shown in the fuel consumption. At a compression ratio of 6.0, the fuel consumption with the copper head was about 20% less than that of the aluminum head. Again, with the copper head, the compression ratio could be increased by about 1 over the aluminum head and still give the same fuel consumption.

Tests were also made with an electroplated layer of copper about 1/8 inch thick. Substantially similar results were obtained.

While we do not wish to be limited by any theory, it seems probable that the high thermal conductivity of copper accounts for its peculiar fitness for use in engine heads. This high conductivity serves to equalize the temperature over the combustion surface, and thus prevent the formation of local hot spots. Copper may have a conductivity nearly three times as great as that of the aluminum alloys commonly used for engine heads.

While any type of copper having a reasonably high conductivity can be used under suitable circumstances, copper containing silver to the amount of about 30 oz. per ton is especially suited for use where strength and stiffness are needed. Such copper has high thermal conductivity and, by cold-working, receives great strength which is unaffected by temperatures which normally occur in engines.

An all-copper head may be made by rolling or forging a slab of copper nearly to the desired thickness and then machining it to shape, or by hot-forging or pressing in dies, the final stage preferably being at a lower temperature to give cold-working. The head may be cast from molten metal may be produced by subjecting pure copper powder to pressing and sintering, or by similar methods using copper particles and particles of a soldering or brazing material, with suitable fluxes or in a suitable atmosphere. Copper alloys of sufficiently high thermal conductivity may, of course, be used in place of pure copper.

A head with only that portion between the engine block and the cooling water made of copper can be produced by the methods set forth above and the upper part of the head be made separable and of other materials. The upper part of a two-part head may be formed from copper or copper alloy.

One in which only those locations in the upper part of the head which lie between the combustion chambers and the cooling water is of copper can be made by stamping or otherwise forming from heavy copper sheet shapes conforming to the combustion domes and such contiguous areas as it is desired to include. These shapes may be inserted into a mold to form parts of the completed head, and a molten copper alloy or other alloy poured into the mold so that it will fuse to the inserted shapes, much as a chaplet is made an integral part of a casting, thus producing a head with copper portions where the high thermal conductivity of copper is most needed, while the various bosses and the gasketing face or faces are made of cast metal.

Or such formed shapes may be prepared, and be welded to a previously-made casting with an opening or openings to receive these shapes. Various methods of welding may be used, among which electric pressure-welding is especially applicable, or the shapes may be brazed into place.

Since good results may be obtained so long as there is a sufficiently thick copper layer on the combustion chamber side of the septum between the engine head and the cooling water, a head may be prepared of such a material as cast-iron or a cast-copper alloy, but lacking from 1/32 inch to 1/8 inch or more of its final thickness, either over its whole lower surface or over selected portions thereof, such as the locations over the combustion domes and some contiguous areas. Copper may then be added to make up the final thickness, as by metal-spraying or by electroplating, which we have succeeded in doing, but which requires care to produce a layer so thick of proper structure, or by stamping out from relatively thin copper sheet a shape or shapes which is or are then inserted into the recess or recesses provided for them and soldered, brazed or welded into firm contact with the cast-iron, copper alloy or other alloy surface. A layer of suitable solder, e. g., silver solder can be put on the copper sheet before or after forming it to the desired shape.

To secure the advantages of our invention, it is preferable that a substantial portion of the wall surface of the combustion chamber of the cylinder head be of copper and this copper must be of sufficient thickness. As stated, other portions of the cylinder head may be of material other than copper. Thus, an all-copper cylinder head may have a cover plate forming the outside wall of the water jacket, of cast-iron or other suitable material. Also, in a head of cast-iron or the like, a copper portion comprising the walls of the combustion chamber, may be inserted. Our invention can also be applied to air-cooled engines, in which a head entirely of copper will be especially advantageous.

A choice would be made among these and other methods of construction that will be apparent to those skilled in the art, according to the requirements of the particular engine to which the head is to be applied, and would depend on the number of cylinders, their spacing, the shape of the combustion domes, whether one head or more than one is to be applied to the engine block, and whether it were desired to have the water jacket of the head free from avoidable joints.

In any embodiment of our invention, a highly desirable feature is the use of a sufficient thickness of copper over the combustion chamber and usually over some contiguous area to avoid or minimize the development of hot and cold spots in the head directly in contact with the gaseous charge. It is less material whether the copper extends all the way back to the cooling water, since, according to our theory and experiment, it is the lack of sufficiently high thermal conductivity from point to point along the inner surface in the head where it faces the gaseous charge, rather than the lack of high conductivity in the path of heat flow from the gaseous charge to the cooling water that prevents the heads of the prior art from giving the results obtained by our invention.

The actual surface film facing the charge may be of materials other than copper, without destroying the ability of the copper to distribute the heat properly. Thus, a film of deposited carbon on the face of the chamber does not prevent the copper from functioning. Similarly, a thin coating or film of chromium or other metal could be electrodeposited upon the face of the copper or copper-lined chamber, without appreciably injuring the performance of the chamber, or without departing from the spirit of this invention.

While we have referred to copper in the above, various copper alloys of good thermal conductivity may be substituted for copper without departing from the spirit of the invention.

The term "cold working" as used in the claims of this application is intended to refer to hammering, forging, or pressing at a temperature below the annealing temperature of the metal. This operation may be effected by rolling, hammering, forging or even by stamping. The "cold working" operation is particularly effective in connection with argentiferous copper which has the property of holding its strength at elevated temperatures, after it has been subjected to "cold working", though the advantages of this operation are not limited to argentiferous copper.

It will be seen from this that we have provided a novel type of cylinder head for internal combustion engines which materially advances the art in that it makes possible the attainment of an increased compression ratio without detonation, a decreased fuel consumption for a given compression ratio and an increased compression ratio with a given fuel consumption.

Our application, Serial No. 28,779, filed June 27, 1935, on Cylinder heads and method of making the same, is a continuation in part of this present application.

Having thus described our invention, what we claim is:

1. In an internal combustion engine, a cylinder head of argentiferous copper.

2. In an internal combustion engine, a cylinder head having its interior formed of argentiferous copper or copper alloys in excess of $\frac{1}{32}$ of an inch in thickness.

3. In an internal combustion engine, a combustion chamber having its interior wall made of copper which has been subjected to cold working.

4. In an internal combustion engine, a cylinder head containing a combustion chamber wall formed wholly or in part of argentiferous copper or alloy.

5. A cylinder head for an internal combustion engine, said cylinder head having at least a portion of its interior wall formed of cold worked argentiferous copper.

6. A cylinder head for an internal combustion engine having at least a portion of its interior wall made of copper or copper alloy which has been formed by pressure.

HOWARD W. RUSSELL.
ERNEST R. DARBY.